No. 724,859. PATENTED APR. 7, 1903.
H. M. HARDING.
MEANS FOR HANDLING MERCHANDISE.
APPLICATION FILED FEB. 10, 1902.
NO MODEL.
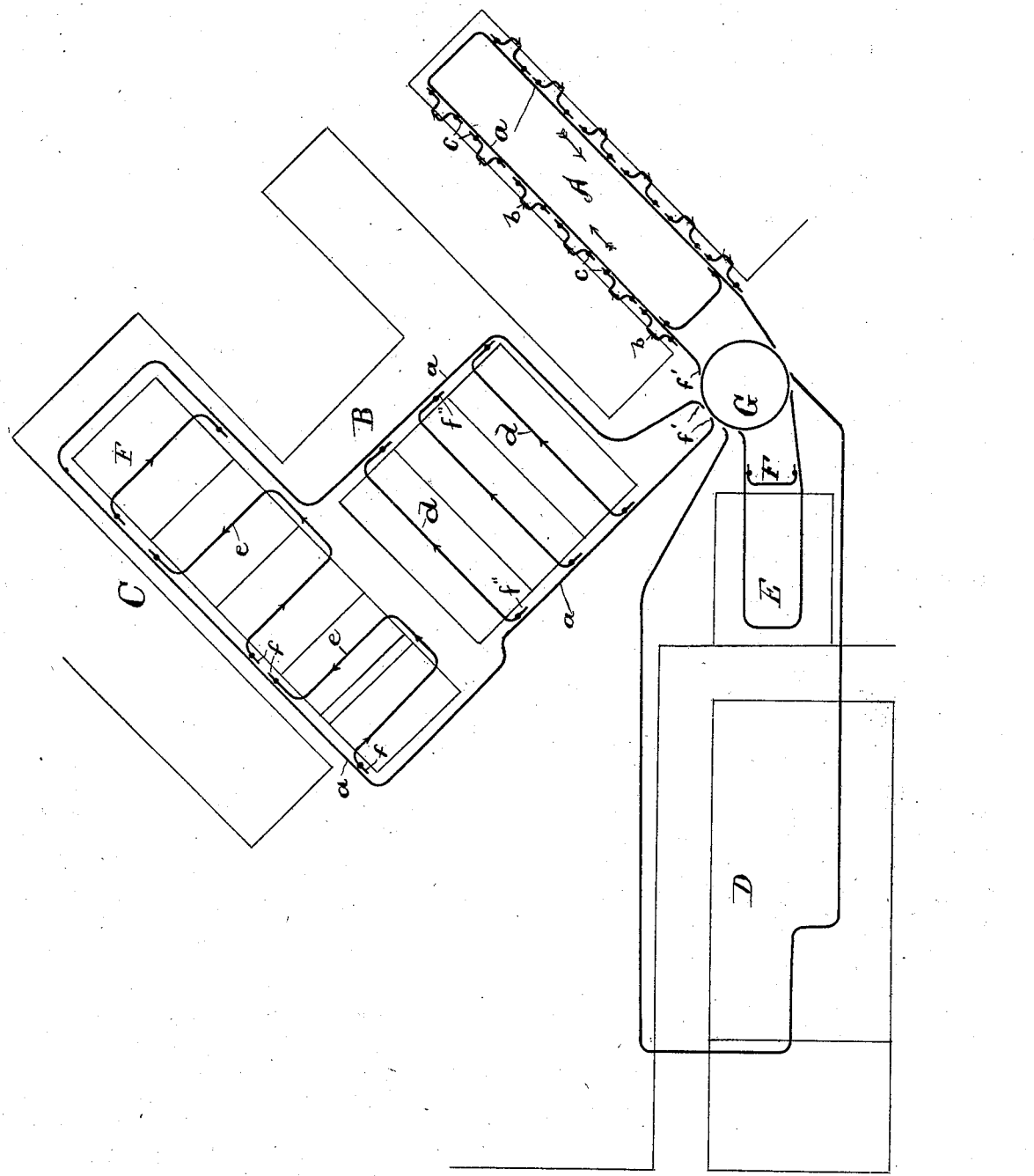
Witnesses
Inventor
Henry M. Harding
By his Attorneys

UNITED STATES PATENT OFFICE.

HENRY M. HARDING, OF NEW YORK, N. Y.

MEANS FOR HANDLING MERCHANDISE.

SPECIFICATION forming part of Letters Patent No. 724,859, dated April 7, 1903.

Application filed February 10, 1902. Serial No. 93,422. (No model.)

*To all whom it may concern:*

Be it known that I, HENRY M. HARDING, a citizen of the United States, and a resident of the city, county, and State of New York, have invented certain new and useful improvements in means for loading and unloading vessels and general handling of freight and cargo on docks, piers, and the like, of which the following is a specification.

In the drawing forming part of this specification I have shown my invention as applied to a group of docks, warehouses, and the like.

The invention is intended to be used with systems of handling freight where electric carriers run on overhead tracks. These tracks may be of any desired construction or may be supported in any suitable way—as, for instance, as shown in my Patent No. 692,137. In equipping docks, warehouses, and the like with these systems it is sometimes necessary to support the track on one side and sometimes on the other, and it is therefore necessary and desirable that the traveling carrier or telpher should be enabled to pass readily from one portion of the system to another and in passing to shift from one side to the other of the track.

In the drawing, A represents the track system for loading or unloading steamers or other vessels. The main track on which the telpher travels is indicated at $a$. At intervals along this track are short loops or sections $b$. These are provided with switches $c$ of any desired shape or construction which enable the trailers or package-carriers to be switched off from the main line onto the loop or back again. In the use of this part of the invention the telpher travels along the main track, hauling any desired number of trailers or package-carriers. These trailers are switched onto the loops and are there loaded with the material which it is desired to transfer. As this system, as shown in the drawing, is installed on both sides of the pier, it will be evident that the loading or unloading of two ships can be carried on simultaneously. When the trailers are loaded with the material desired to be conveyed, the telpher travels along the track, picks up the trailers, and hauls them to their destination. This operation of loading and unloading may be carried on rapidly with the least possible labor and with but a single handling of the goods.

Any form of telpher or any form of trailer may be used, though I prefer to use a trailer having a power hoisting apparatus attached thereto for heavy work, while one with a pulley would preferably be used for that style of freight or merchandise which is put up in relatively small packages.

B represents another portion of my system designed to cover space in which goods are stored in large quantities. Here the main track A runs around the space. Running from side to side, connecting the sections of the main track, are gravity-lines $d$, provided at each end with switches $f''$, which will afford means for switching trailers from the main line onto or off from the gravity-line. The direction of the grade is shown by the arrows. In the operation of this part of my system the telpher and its trailers loaded with goods pass along the main line and the trailers are switched off onto the gravity-lines, down which they run until they reach a point over the place where the goods are to be deposited. When the goods have been lowered from the trailer, it is passed on down the gravity-line to the other side, where by means of the switch it can be hauled onto the main track by the telpher as it passes along. The grade of these gravity-lines is made slight, so that the trailer may be easily pushed along by the workman standing below, but yet beyond danger of getting beyond control, or they may be of steeper grade, in which case brake mechanism of any desired construction may be used on the trailers. While I have described this part of my system for storing goods, it will be observed that the same system will be useful in transferring the goods from the storage place to some other desired point.

At C, I have illustrated another portion of my system, which consists of a main line or track and gravity-loops $e$, having switches $f$, which make connection with the main track. These loops are made of such size as to cover a considerable portion of the space above the floor, and they are given a slight grade from one switch to the other, as indicated by the arrows. The use of this device is substantially the same as that heretofore described. The trailers are switched off onto the loops and run by gravity to any desired position on the loop. When the goods have been unloaded, the trailers run down to the main line and by means of the switch may be hauled by the trailer onto the main line.

At D, I show a main line running around a warehouse, and at E a short line running into a portion of the warehouse.

At F, I have shown a crossover.

At G is a circular section of the road, from which the various sections radiate. At this point each section is provided with flexible switches $f'$—that is, switches which may be thrown in either direction. By means of this system I am enabled to send the telphers not only from one section, but to do so regardless of which side of the section the track is supported from. The supports for the central section G are on the inside—that is to say, the telpher runs around on the outside of the circle. Suppose, for instance, that a telpher which travels on section A in the direction of the arrows and travels on the inside of the track is to be sent over systems B and C, in which the telpher must run over the outside of the track. The telpher will run onto the circular track by the switch $k$, and it will then run around that track on the outside thereof until it reaches the section B. Here the flexible switch $f'$ will be thrown, and it will be seen that the telpher will run onto the main track of the section B and on the outside thereof, having thus been transferred from the inside of one section to the outside of the other. It will be noted without further explanation that by means of this central section and these flexible switches the telpher may be sent from any one part of the system to the other and be made to travel on the inside or the outside of the suspended track as may be necessary. I have shown but two crosscovers F, though these may be placed at any point where they are found convenient or necessary and are simply for transferring the telpher from one track of the system to another without going entirely around the system.

It will be obvious that this system may be varied in many ways without departing from my invention, that it is capable of many uses, and that it may be used in any place where different buildings or docks are to be reached or a large amount of territory covered.

It is not necessary that the central section should be circular in form. It may be of any shape so long as it is a closed section.

I claim—

1. In an overhead carrier system, the combination of sections of overhead railway, a central closed section, and flexible switches connecting the various sections with the central section in either direction, substantially as described.

2. In an overhead carrier system, the combination of a central closed section, other sections radiating therefrom, and flexible switches between the central and radiating sections, substantially as described.

3. In an overhead carrier system, the combination of means for transferring merchandise consisting of a railway running around the space to be covered, transverse gravity-lines between the branches of the main line, and switches connecting the gravity-lines with the main line, substantially as described.

4. In an overhead carrier system, the combination of the main line on which the carrier runs, gravity-loops extending substantially across the space between the sides of the main line, and switches connecting said gravity-loops to one branch of the main line, substantially as described.

In testimony whereof I have hereunto set my hand, in the city, county, and State of New York, this 5th day of February, 1902.

HENRY M. HARDING.

In presence of—
E. M. HARMON,
LOUIS N. WHEATTON.